Dec. 5, 1950 C. R. HARSH 2,533,009

DISK SHARPENER

Filed April 18, 1947 2 Sheets-Sheet 1

Witness
Edward P. Seeley

Inventor
Carl R. Harsh
by Harry L. Younger
Attorney

Dec. 5, 1950 C. R. HARSH 2,533,009

DISK SHARPENER

Filed April 18, 1947 2 Sheets-Sheet 2

Inventor
Carl R. Harsh
by Harry L. Yinger
Attorney

Witness
Edward P. Seeley

Patented Dec. 5, 1950

2,533,009

UNITED STATES PATENT OFFICE 2,533,009

DISK SHARPENER

Carl R. Harsh, Newton, Iowa

Application April 18, 1947, Serial No. 742,304

3 Claims. (Cl. 51—161)

This invention relates to a portable disc sharpening structure and more particularly, relates to a disc sharpening structure mounted on a vehicle trailer unit which in turn is attached to some kind of tractor unit so the sharpening structure can be pulled to the disc instead of the disc brought to the sharpening structure when the disc becomes dull and needs sharpening.

The disc is a very important farm implement in preparing the soil for planting. The disc is made up of a series of blades that are rotatably mounted on a supporting structure for the blades. The blades are sharp and cut into the plowed earth to reduce it in size or to cut into the earth before plowing takes place. Just as any other sharp bladed instrument, continued use dulls the blade and it is necessary to restore a sharp edge by sharpening. The discs can be made any length desired and in some instances are used in tandem. The discs are quite heavy and cumbersome and if a farmer must haul the disc to town for sharpening, it presents a difficult handling job to load the disc on a wagon and transport it to town for sharpening. It must be loaded and unloaded again at the blacksmith shop and unloaded when brought home again. The handling and time lost becomes a material item. It is with the problem of transporting a sharpening means to the farm to sharpen discs that the present invention is concerned.

It is an object of the invention, among others, to provide a disc sharpening structure that is portable in the form of a vehicle trailer unit and can be attached to a tractor and transported to the disc for sharpening the disc instead of bringing the disc to the sharpener; a portable disc sharpener that includes its own motive power source; a portable disc sharpener that includes means to lift the disc into place on the sharpener thus cutting the labor needed to a minimum; a portable disc sharpener that can be operated by one man; a portable disc sharpener that is simple in construction and operation, easy to operate and economical both in construction and operation; a portable disc sharpener that is long lasting and more durable in operation, requiring less repair and lost time in operation; a portable disc sharpener easy to operate, simple in design and easy of repair in case of breakdown; a portable disc sharpener requiring no special skill on the part of an operator to mount a disc thereon and to sharpen the blades after mounting; and a portable disc sharpener that can be supplied and operated at a much lower cost than anything on the market at present.

In carrying out the objects of the invention there is provided a portable disc sharpener mounted on a vehicle unit with a motive power source mounted on the vehicle. There are spaced support members on the vehicle between which a disc made up of a series of blades is rotatably mounted. The one support member has means mounted thereon and connected with the motive power source to rotate the disc. The second support member is adjustable along the vehicle to clamp the disc rotatably between the support members. A lifting member in the form of an overhead crane is mounted on the vehicle to lift the disc into place between the support members from a position directly beneath the vehicle. The supporting members and the overhead crane are supported from side portions of the vehicle, which in the structure shown may be pipes, and the second supporting member is longitudinally movable on the pipe members to clamp the disc in place. One of the side portions of the vehicle is substantially higher than the other side portion of the vehicle to provide space for the disc to be lifted upwardly from beneath the vehicle and be supported by the supporting members. A sharpening tool is associated with the vehicle and brought into contact with the individual blades of the disc as the disc rotates on the vehicle. The sharpening tool is movably associated with the vehicle by being longitudinally movable along the vehicle and also pivotally movable with respect to the vehicle to be moved into contact with the blades. The sharpening tool is made up of a pair of pivoted arms; one arm carrying a cutting portion to sharpen the face of a blade and the other arm contacting the back of the blade to provide a reaction point to hold the cutting tool on the blade as the disc rotates on the vehicle. The sharpening tool has a saddle portion to fit over one of the pipe members with the saddle portion slidable along one of the pipe members so as to be longitudinally movable and the saddle portion can pivot around the pipe member so as to pivot into or away from the blades of the disc.

With the foregoing and other objects in view, the invention will be more fully described herewith and will be particularly pointed out in the claims appended hereto.

In the drawings, wherein like symbols refer to like or corresponding parts throughout the several views.

Figures 1, 2:
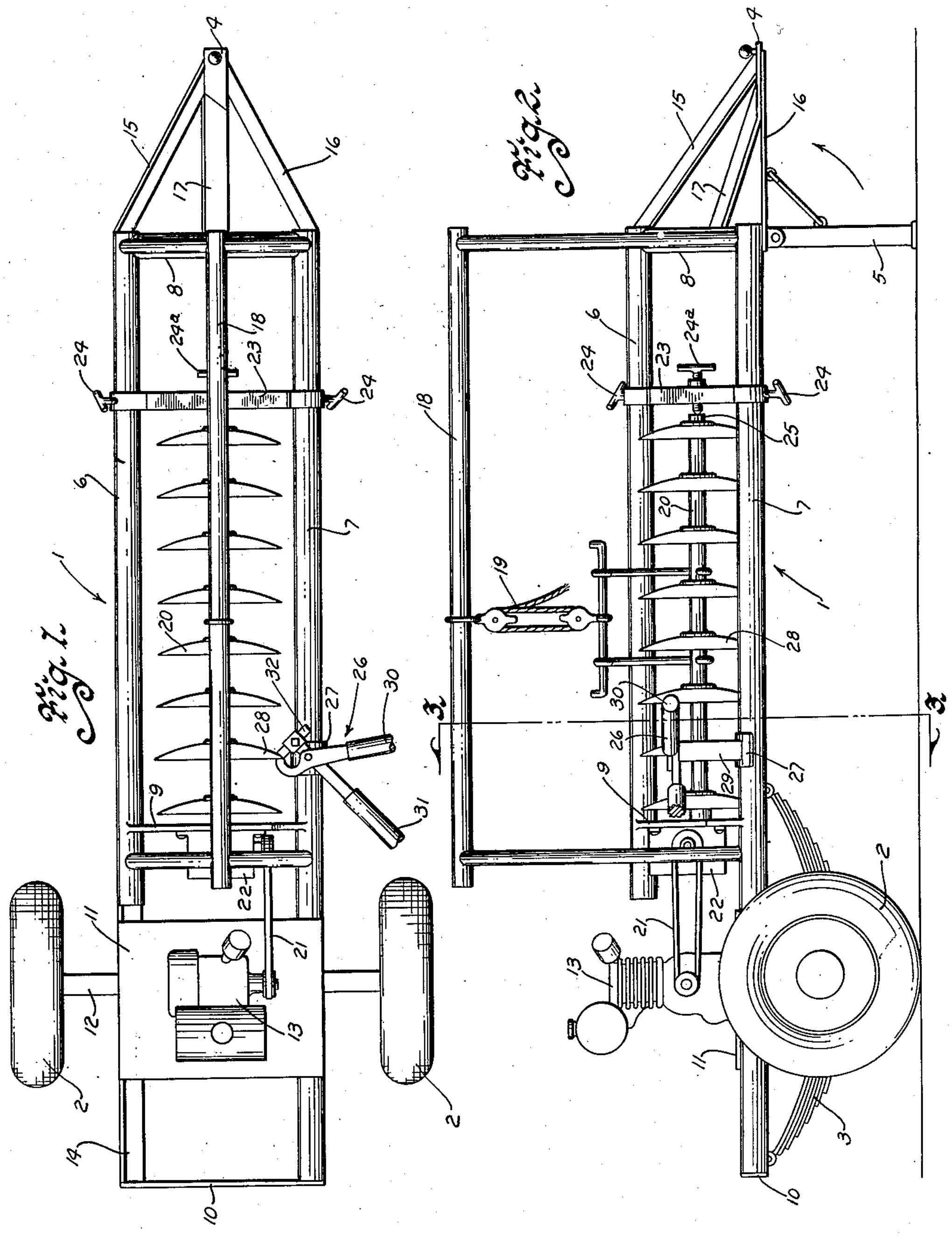
Figure 1 is a top plan view showing the portable disc sharpener with a disc mounted therein and the sharpening tool in place on a blade.
Figure 2 is a side elevational view showing the portable disc sharpener with a disc mounted therein, the sharpening tool in place on a blade and the vehicle supported free of a tractor.

The portable disc sharpener is shown mounted on a vehicle 1 which is in the form of a trailer having wheels 2 at the rear thereof and springs 3 to resiliently mount the vehicle body with relation to the wheels 2. The front of the vehicle has a hitch 4 that may be attached to any type tractor to transport the trailer vehicle from place to place. A strut 5 may be dropped to support the front end of the vehicle 1 if detached from a tractor.

Figure 3:
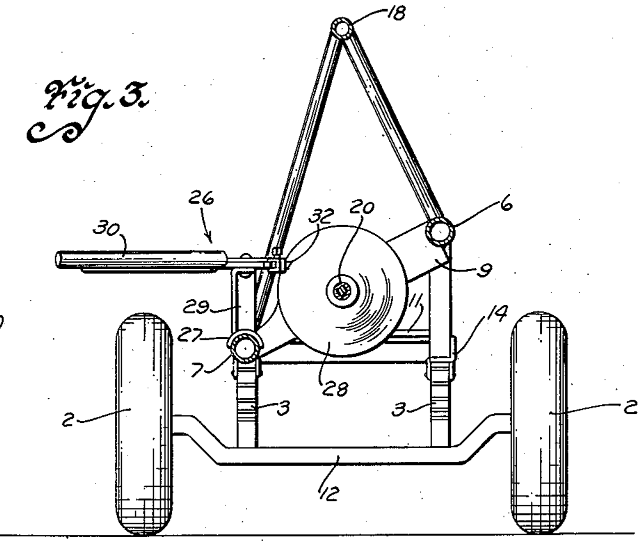
Figure 3 is a sectional view taken on the line 3—3 of Figure 2.
Figure 5:
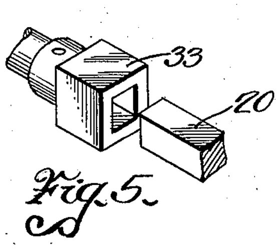
Fig. 5 is an enlarged perspective view of the socket and disc shaft end.

The vehicle trailer 1 is made up of side portions 6 and 7 which are spaced apart and held together by welding cross members 8 and 9 to the side portions 6 and 7. The side portions may be made of pipes approximately two inches in diameter and the portions 6, 7, 8 and 9 when assembled make up a body portion of the vehicle trailer 1. The pipe member 6 terminates short of the pipe member 7 with the pipe member 7 running to the rear of the vehicle trailer 1. The spring members 3 as best shown in Figure 3, attach to the axle 12 carrying wheels 2 on their bottom side and the right hand spring 3, viewed from the rear of the vehicle trailer 1, has its end portions attached to the pipe member 7. The other spring 3 has an angle iron 14 attached from end to end of the spring 3 and the pipe 7 and angle iron 14 are attached together in the rear by cross member 10. A plate 11 extends across the rear portion of the vehicle trailer 1 and is attached to both pipe 7 and angle iron 14 to support a motive power source 13. The hitch 4 comprises an iron 15 attached to end of pipe 6, an iron 16 attached to the end of pipe 7 and an iron 17 attached to the middle of cross member 8, all converging to a point to form the hitch 4.

Attached to the pipes 6 and 7 is an overhead crane arrangement 18 having a pulley arrangement 19 for lifting a disc 20 into place on the vehicle trailer for sharpening purposes. The disc 20 is placed under the vehicle, directly beneath the overhead crane 18; the pulley arrangement 19 attached to the disc 20 and the disc is lifted into place on the vehicle 1 by one man. In fact the disc 20 can be rolled under the vehicle 1 by one man with no lifting on his part, hence the whole arrangement only needs one man for operation. It is noted that the pipe 6 is in a higher plane than the pipe 7 for the purpose of allowing more space to locate the disc 20 in the vehicle for sharpening purposes as clearly shown in Figure 3.

The motive power source 13 connects by V-belt 21 with a gear transmission and speed reduction means 22 to furnish power for rotating the disc 20 for the sharpening operation. The gear transmission and speed reduction means 22 is attached to cross member 9 and has a socket portion designated 33 into which a square shaft on the end of the disc 20 fits to transmit power to the disc 20 to rotate the disc 20. The cross member 9 is stationary and forms a supporting member for one end of the disc 20 when mounting the disc 20 in the vehicle 1 for sharpening purposes.

A second supporting member 23 is longitudinally adjustable on the pipe members 6 and 7 with bolts 24 tightened to hold the supporting member 23 against longitudinal movement when it is properly spaced on pipe members 6 and 7. When the disc 20 is lifted into place between pipes 6 and 7, supporting member 23 is properly spaced on pipes 6 and 7 and bolts 24 tightened to hold supporting member 23 in the proper position. The end of shaft 25 on disc 20 is hit with a punch to form a small depression and screw 24a is advanced into the depression to clamp the disc 20 rotatably between the support members 9 and 23.

Figure 4:
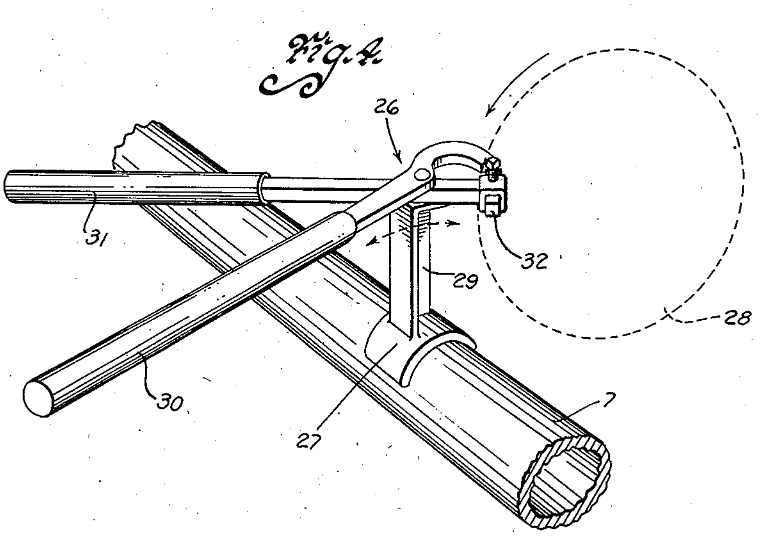
Figure 4 is a close-up elevational view showing the sharpening tool.

A sharpening tool 26 is mounted on pipe 7 as shown in all the figures but more clearly shown in Figure 4. The tool 26 has a saddle portion 27 made in the form of an arc of a circle and when placed on the pipe 7 is concentric with pipe 7. The saddle portion 27 just sits on the pipe 7 hence the tool 27 is longitudinally movable on pipe 7 as well as being pivotally mounted on pipe 7; that is moving toward or away from a blade 28 of disc 20 as indicated by arrow in Figure 4. A pedestal portion 29 attaches to the saddle portion 27 and has arms 30 and 31 pivotally connected together on the top of pedestal 29 in the same manner as a pair of scissors. The arm 31 on the end thereof carries a piece of cutting steel 32. The cutting steel 32 is harder than the steel of blade 28 hence when brought into contact with the face of blade 28, there will be a wearing away of the steel of the blade and hence a sharpening action on the blade. The end of arm 30 contacts the back of blade 28 to form a reaction point for holding the cutting tool 32 against the front face of blade 28.

In operation, the vehicle trailer 1 is attached by hitch 4 to a tractor unit (not shown) which may be an automobile, small truck or any member able to pull the vehicle trailer 1. The tool 26 is of course removed when towing the vehicle trailer 1 and carried where it won't be lost off the trailer vehicle 1. When the vehicle 1 arrives at a farm, the vehicle trailer 1 may be uncoupled from the tractor or not. If uncoupled, strut 5 is lowered to support one end of the trailer unit. The operator then removes the disc from the disc supporting structure and rolls the disc under the vehicle. The pulley arrangement is then attached to the disc, as shown in Figure 2, grasping the disc 20 as close to the center as possible and then lifted upwardly to the height shown in Figure 2. The longitudinally adjustable supporting member 23 is moved out of the way so the disc can be maneuvered to couple the square shaft on the end of the disc 20 into the socket on supporting member 9. When thus coupled, the supporting member 23 is moved forwardly until the screw 24A can contact the end of shaft 25 of the disc 20 after which screws 24a are tightened. The pulley arrangement is then removed from the disc and swung out of the way and motive power source 13 is set into operation to rotate the disc 20. The speed of the disc is about 7 or 8 R. P. M.

The operator then places tool 26 on pipe 7 and starts at one end or other of the disc on the sharpening of the individual blades 28. The saddle portion 27 seats on pipe 7 and the operator grasps arms 30 and 31. The arms 30 and 31 are opened so as to allow a blade 28 to enter and the arms are then closed with arm 30 contacting the back of blade 28 and the cutting steel 32 doing the sharpening.

It will be understood that the invention has been described for purposes of illustration and explanation and that changes and variations are possible without departing from the scope of the invention; all such modifications and changes are intended to be included in the appended claims.

I claim:

1. A disc sharpener designed to rest on a supporting surface comprising; an elongated frame of two spaced apart pipe members so positioned that a plane extending through their longitudinal axes forms an angle with the plane of a supporting surface, an auxiliary frame secured to the rear end of said frame; said auxiliary frame having its bottom portions parallel to the plane of a supporting surface, a means secured to the bottom portion of said auxiliary frame for rollably holding the rear end of said frame above a supporting surface, a disc shaft supporting and gripping member fixed at one end of said frame, a source of power for rotating said disc shaft supporting and gripping member fixed to said frame, a means for operatively connecting said power source and said disc shaft gripping and supporting means, a disc shaft supporting and centering mechanism slidably adjustable and mounted on the pipe members of said frame for rotatably supporting one end of a disc shaft at times, a disc sharpening tool assembly slidably and pivotably mounted on said frame, and a means for universally and detachably hinging the front end of said frame to a prime mover at times.

2. A disc sharpener designed to rest on a supporting surface comprising; an elongated frame of two spaced apart pipe members so positioned that a plane extending through their longitudinal axes forms an angle with the plane of a supporting surface, an auxiliary frame secured to the rear end of said frame; said auxiliary frame having its bottom portions parallel to the plane of a supporting surface, a means secured to the bottom portion of said auxiliary frame for rollably holding the rear end of said frame above a supporting surface, a disc shaft supporting and gripping member fixed to said frame, a means for operating said supporting and gripping member by rotating it, a disc shaft supporting and centering mechanism slidably adjustably mounted on the pipe members of said frame for rotatably supporting one end of a disc shaft at times, a disc sharpening tool assembly slidably and pivotably mounted on said frame pipe member, and means for universally and detachably hinging the front end of said frame to a prime mover at times, and an adjustably movable jack stand for supporting the front end of said frame above a supporting surface at times.

3. A disc sharpener designed to rest on a supporting surface comprising; an elongated frame of two spaced apart pipe members so positioned that a plane extending through their longitudinal axes forms an angle with the plane of a supporting surface, an auxiliary frame secured to the rear end of said frame; said auxiliary frame having its bottom portions parallel to the plane of a supporting surface, a means secured to the bottom portion of said auxiliary frame for rollably holding the rear end of said frame above a supporting surface, a disc shaft supporting and gripping member fixed at one end of said frame, a source of power for rotating said disc shaft supporting and gripping member, a means for operatively connecting said power source and said disc shaft gripping and supporting means, a cross member slidably adjustable on, supported by, and extending between the pipe members of said frame, a disc shaft turning point adjustably threading into said cross member.

CARL R. HARSH.

REFERENCES CITED

The following references are of record in the file of this patent:

UNITED STATES PATENTS

| Number | Name | Date |
|---|---|---|
| 650,158 | Stubcare et al. | May 22, 1900 |
| 760,889 | Machin | May 24, 1904 |
| 797,565 | Durner | Aug. 22, 1905 |
| 900,707 | Combs et al. | Oct. 13, 1908 |
| 930,263 | Adamson | Aug. 3, 1909 |
| 1,003,340 | Combs | Sept. 12, 1911 |
| 1,249,608 | Fotheringham | Dec. 8, 1917 |
| 1,599,355 | Arthur | Sept. 7, 1926 |
| 1,766,277 | Blackman | June 24, 1930 |
| 1,886,859 | Wright | Nov. 8, 1932 |
| 2,244,586 | Venable | June 3, 1941 |
| 2,307,826 | Donason | Jan. 12, 1943 |